United States Patent
Im

(10) Patent No.: US 12,083,442 B2
(45) Date of Patent: Sep. 10, 2024

(54) MULTI-DIMENSIONAL BADUK BOARD AND ONLINE MULTI-DIMENSIONAL BADUK SYSTEM

(71) Applicant: Song Kug Im, Seoul (KR)

(72) Inventor: Song Kug Im, Seoul (KR)

( * ) Notice: Subject to any disclaimer, the term of this patent is extended or adjusted under 35 U.S.C. 154(b) by 226 days.

(21) Appl. No.: 17/729,529

(22) Filed: Apr. 26, 2022

(65) Prior Publication Data

US 2023/0277917 A1 Sep. 7, 2023

(30) Foreign Application Priority Data

Mar. 4, 2022 (KR) .................. 10-2022-0027820

(51) Int. Cl.
*A63F 3/00* (2006.01)

(52) U.S. Cl.
CPC ...... *A63F 3/00176* (2013.01); *A63F 3/00643* (2013.01); *A63F 2003/00186* (2013.01); *A63F 2003/0022* (2013.01)

(58) Field of Classification Search
None
See application file for complete search history.

(56) References Cited

U.S. PATENT DOCUMENTS

2006/0175754 A1 * 8/2006 Eggers ............... A63F 3/00214
273/260
2019/0009168 A1 * 1/2019 Aman ................ A63F 3/00643

FOREIGN PATENT DOCUMENTS

| KR | 2000-0030912 | | 6/2000 | |
| KR | 2006122084 A | * | 11/2006 | ......... A63F 3/00214 |
| KR | 10-2007-0049626 | | 5/2007 | |
| KR | 10-0712742 | | 5/2007 | |

OTHER PUBLICATIONS

English translation for KR1020050044062.*
English translation for KR1020070042398.*

* cited by examiner

*Primary Examiner* — Jason T Yen
(74) *Attorney, Agent, or Firm* — KILE PARK REED & HOUTTEMAN PLLC

(57) ABSTRACT

Disclosed are a multi-dimensional baduk board and an online multi-dimensional baduk system implemented to have a plurality of baduk faces and to play baduk in a more diverse and interesting way, having the advantage of overcoming the limitations of a two-dimensional baduk board in the related art to give more interest to users than baduk in the related art and being helpful in terms of developing a user's brain, and having an effect that it is possible to play multi-dimensional baduk online by using such a baduk board structure.

8 Claims, 5 Drawing Sheets

MULTI-DIMENSIONAL BADUK BOARD AND ONLINE MULTI-DIMENSIONAL BADUK SYSTEM

BACKGROUND

1. Technical Field

The present disclosure relates to a baduk board and a baduk system, and more particularly, to a multi-dimensional baduk board and an online multi-dimensional baduk system implemented to have a plurality of baduk faces and to play baduk in a more diverse and interesting way.

2. Related Art

Currently, baduk is a very popular game and is known to be a great help in brain training, so parents often teach baduk to their children for educational purpose.

However, in an existing baduk board, baduk stones may be placed only in a two-dimensional space, not a three-dimensional space.

When there is a baduk board on which baduk stones may be placed in a three-dimensional space, a three-dimensional baduk game becomes possible. If so, it will be more fun than the existing two-dimensional baduk, and in terms of brain development, it will be more beneficial because it helps in developing a three-dimensional spatial sense rather than a two-dimensional spatial sense.

In two-dimensional baduk, a baduk stone dies when the four directions of the baduk stone such as east, west, south, and north are blocked, but in three-dimensional baduk, a baduk stone dies when the six directions of the baduk stone such as east, west, south, north, up, and down are blocked.

Currently, in addition to playing offline baduk, online baduk played on the Internet becomes popular.

In such Internet baduk, a server of an online baduk service company (for example, Oro Baduk or Tygem Baduk) is connected to the Internet and distributes a baduk program to be installed on client computers of members so that the program is installed, and then the client computers connect to the server through the Internet and the members play baduk online when the members want to play baduk.

When three-dimensional baduk can be played on the Internet, more people can desirably enjoy it. In the case of two-dimensional baduk, it is easy to display the positions of a baduk board and baduk stones on a screen so that they can be easily understood at a glance. However, in the case of three-dimensional baduk, it is very difficult to display the positions of a baduk board and baduk stones on a screen so that they can be easily understood at a glance.

SUMMARY

The technical problem to be solved by the present disclosure is to provide a multi-dimensional baduk board and an online multi-dimensional baduk system implemented to have a plurality of baduk faces and to play baduk in a more diverse and interesting way in a multi-dimensional space beyond a two-dimensional space.

In order to solve the above problem, a multi-dimensional baduk board in accordance with the present disclosure may include: a first baduk face including a plane in which a plurality of parallel horizontal lines intersect the same number of parallel vertical lines as the horizontal lines; and a second baduk face located vertically above the first baduk face and including a plane in which a plurality of parallel horizontal lines intersect the same number of parallel vertical lines as the horizontal lines, wherein intersection points where the horizontal lines and the vertical lines on the first baduk face intersect correspond respectively to intersection points where the horizontal lines and the vertical lines on the second baduk face located vertically above intersect, and are respectively connected through virtual connection lines.

In order to solve the above problem, an online multi-dimensional baduk system that may allow online users to play multi-dimensional baduk by using a multi-dimensional baduk board including a first baduk face and a second baduk face, the first baduk face including a plane in which a plurality of parallel horizontal lines intersect the same number of parallel vertical lines as the horizontal lines, the second baduk face being located vertically above the first baduk face and including a plane in which the same number of parallel horizontal lines and parallel vertical lines as the parallel horizontal lines and the parallel vertical lines of the first baduk face intersect.

A multi-dimensional baduk board and an online multi-dimensional baduk system in accordance with the present disclosure have the advantage of overcoming the limitations of a two-dimensional baduk board in the related art to give more interest to users than baduk in the related art, and being helpful in terms of developing a user's brain.

Furthermore, there is another effect that it is possible to play multi-dimensional baduk online by using such a baduk board structure.

DETAILED DESCRIPTION

Hereinafter, preferred embodiments of the present disclosure will be described in detail with reference to the accompanying drawings.

Figure 1:
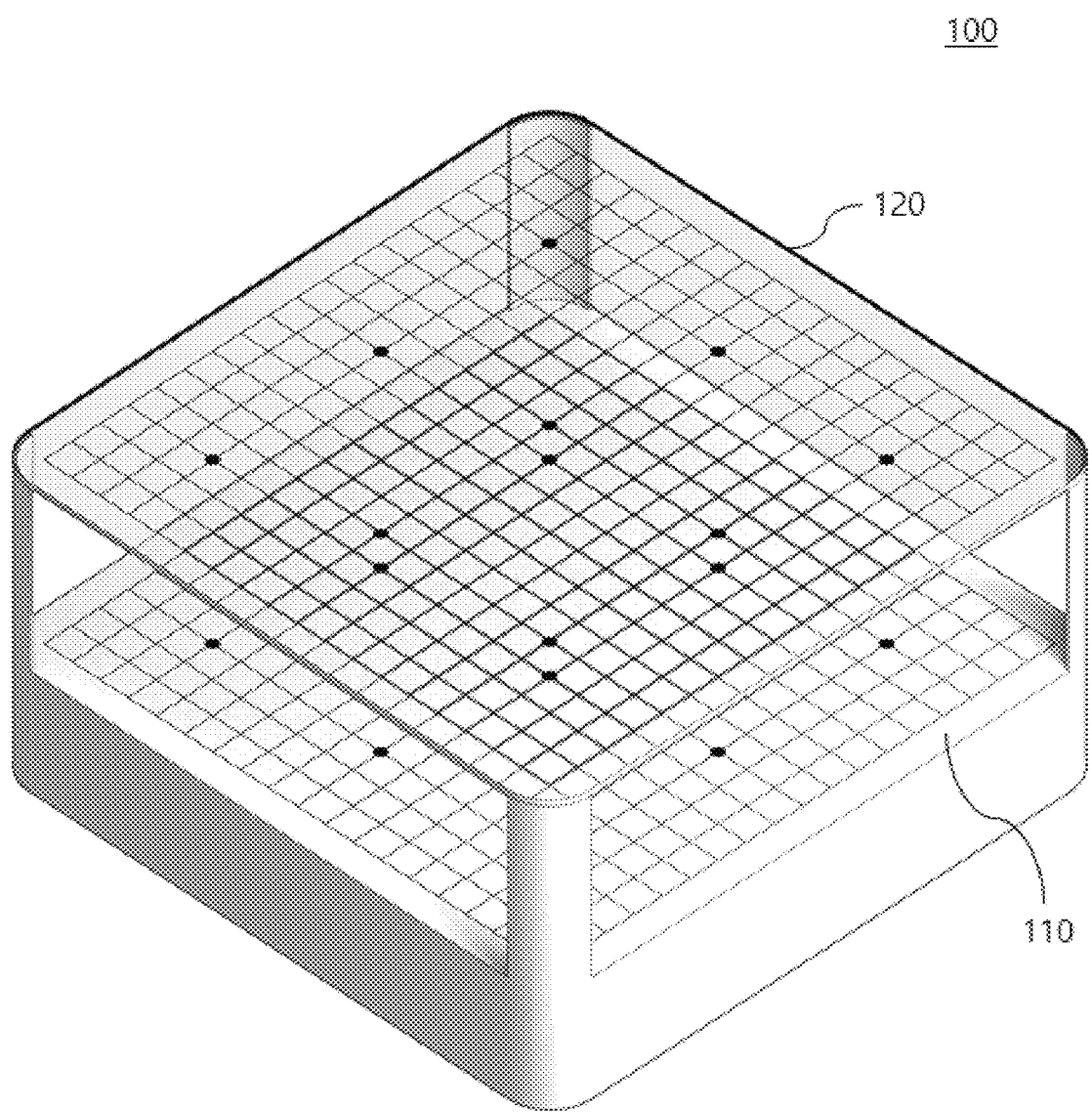
FIG. 1 is a diagram schematically illustrating the configuration of a multi-dimensional baduk board in accordance with the present disclosure.

FIG. 1 is a diagram schematically illustrating the configuration of a multi-dimensional baduk board 100 in accordance with the present disclosure.

Referring to FIG. 1, the multi-dimensional baduk board 100 in accordance with the present disclosure includes a first baduk face 110 and a second baduk face 120.

The first baduk face 110 includes a plane in which a plurality of parallel horizontal lines intersect the same number of parallel vertical lines as the horizontal lines.

The second baduk face 120 includes a plane in which a plurality of parallel horizontal lines intersect the same number of parallel vertical lines as the horizontal lines.

Intersection points where the horizontal lines and the vertical lines on the first baduk face 110 intersect correspond respectively to intersection points where the horizontal lines and the vertical lines on the second baduk face 120 located vertically above intersect, and are respectively connected through virtual connection lines.

At least one third baduk face (not illustrated) may be sequentially located vertically above the second baduk face 120, the third baduk face including a plane in which the same number of parallel horizontal lines and parallel vertical lines as those of the second baduk face 120 intersect.

The number of the horizontal lines and the vertical lines included in each of the first baduk face and the second baduk face are not particularly limited, but are each preferably 19.

FIG. 2 to FIG. 5 are diagrams each illustrating an embodiment of a display screen 200 according to an online multi-dimensional baduk system of the present disclosure.

Figure 2:
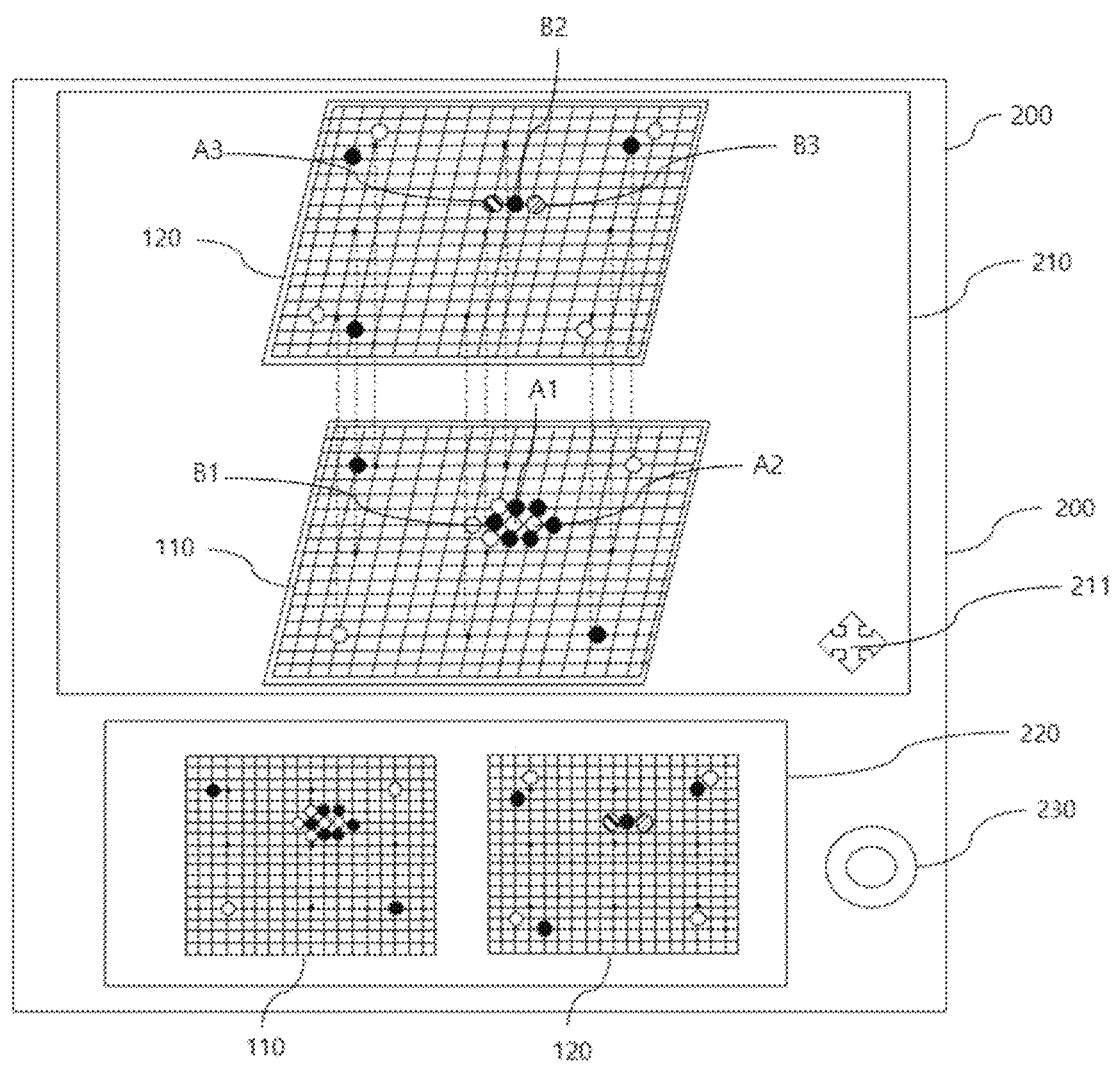
FIG. 2 is a diagram illustrating an embodiment of a display screen of an online multi-dimensional baduk system in accordance with the present disclosure.

As illustrated in FIG. 2, the display screen 200 of the online multi-dimensional baduk system in accordance with the present disclosure may include a main screen 210, a sub-screen 220, and a menu button 230.

The main screen 210 is three-dimensionally displayed in a state where the first baduk face 110 and the second baduk face 120 are connected in a multi-dimensional manner, the first baduk face 110 including the plane in which the plurality of parallel horizontal lines intersect the same number of parallel vertical lines as the horizontal lines, the second baduk face 120 located vertically above the first baduk face 110 and including the plane in which the same number of parallel horizontal lines and parallel vertical lines as those of the first baduk face 110 intersect.

The intersection points where the horizontal lines and the vertical lines on the first baduk face 110 intersect correspond respectively to the intersection points where the horizontal lines and the vertical lines on the second baduk face 120 located vertically above intersect, and are respectively connected through the virtual connection lines.

Existing baduk rules are equally applied to each of the first baduk face 110 and the second baduk face 120, and are also equally applied between the first baduk face 110 and the second baduk face 120.

Accordingly, a first color (for example, white) of baduk stone located at an intersection point of the first baduk face 110 is caught when a second color (for example, black) of baduk stones are placed at intersection points in the east, west, south, and north directions on the first baduk face 110, which surround the first color of baduk stone, and an intersection point on the second baduk face 120, which corresponds to the intersection point of the first baduk face 110 on which the first color of baduk stone is placed.

Referring to FIG. 2, two white stones indicated by A1 and A2 on the first baduk face 110 are surrounded by six black stones. According to the baduk rules in the related art, the two white stones indicated by A1 and A2 are caught, but in the present disclosure, the two white stones indicated by A1 and A2 may escape in the direction of the second baduk face 120.

In such a case, since a black stone indicated by B2 has been already placed at one of positions on the second baduk face 120, which correspond to the two white stones indicated by A1 and A2, the white stone may only escape to a position indicated by B3.

In such a case, when it is the turn of a user who holds a black stone, the user may catch the two white stones indicated by A1 and A2 by placing a black stone at the position indicated by B3. However, when it is the turn of a user who holds a white stone, the user may succeed in escaping by placing a white stone at the position indicated by B3.

On the other hand, one black stone indicated by B1 on the first baduk face 110 is surrounded by four white stones. According to the baduk rules in the related art, the one black stone indicated by B1 is caught, but in the present disclosure, the one black stone indicated by B1 may escape in the direction of the second baduk face 120. In such a case, a position on the second baduk face 120, which correspond to the one black stone indicated by B1, corresponds to A3.

In such a case, when it is the turn of a user who holds a black stone, the user may succeed in escaping by placing a black stone at the position indicated by A3. However, when it is the turn of a user who holds a white stone, the user may catch the one black stone indicated by B1 by placing a white stone at the position indicated by A3.

According to the above rules, a user may enjoy multi-dimensional baduk with other online users through the first baduk face 110 and the second baduk face 120 displayed on the main screen 210.

On the other hand, in the case of a single baduk face as in the related art, the positions of the baduk face and baduk stones can be easily understood at a glance. However, in the case of the multi-dimensional baduk system as in the present disclosure, it may be very difficult to easily understand the relationship between the positions of baduk stones, survival and death, and the like at a glance.

Therefore, in the online multi-dimensional baduk system in accordance with the present disclosure, it is preferable that the first baduk face 110 and the second baduk face 120 are displayed in different colors on a screen. Furthermore, it is more preferable that edges of first and second baduk stones placed on the first baduk face 110 are displayed in the same color as that of the first baduk face 110, and edges of first and second baduk stones placed on the second baduk face 120 are displayed in the same color as that of the second baduk face 120.

Additionally, the online multi-dimensional baduk system in accordance with the present disclosure may further include baduk face rotation display means that allows a user to understand the relationship between the positions of baduk stones, survival and death, and the like at a glance by displaying the first baduk face 110 and the second baduk face 120 on a screen in various directions.

That is, a user may more easily understand the relationship between the positions of baduk stones, survival and death, and the like by clicking on a baduk face rotation button 211 located on the main screen 210 and observing the first baduk face 110 and the second baduk face 120 in various directions while rotating the first baduk face 110 and the second baduk face 120.

On the other hand, on the sub-screen 220, the first baduk face 110 and the second baduk face 120 may be separately displayed. In the present disclosure, since the existing baduk rules are applied to each of the first baduk face 110 and the second baduk face 120 as they are, it is also very important to understand individual situations in each of the first baduk face 110 and the second baduk face 120.

Accordingly, a user may check a state in which the first baduk face 110 and the second baduk face 120 are connected in a multi-dimensional manner on the main screen 210 and check respective states of the first baduk face 110 and the second baduk face 120 on the sub-screen 220.

On the other hand, the online multi-dimensional baduk system in accordance with the present disclosure may further include screen selection means for selectively allowing the first baduk face 110 and the second baduk face 120 to be three-dimensionally displayed on the main screen or selectively allowing any one of the first baduk face 110 and the second baduk face 120 to be displayed on the main screen, according to user's needs.

Figure 3:
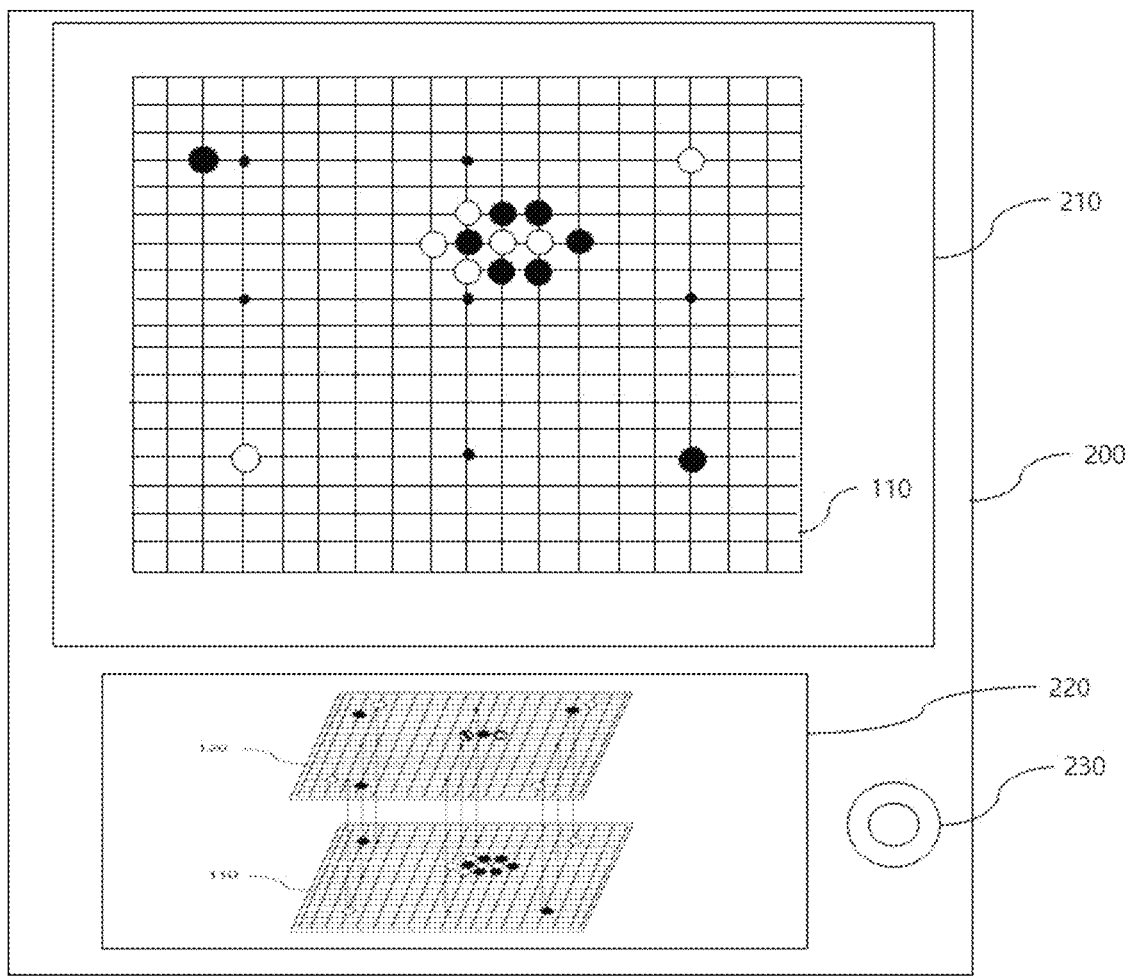
FIG. 3 is a diagram illustrating another embodiment of a display screen of the online multi-dimensional baduk system in accordance with the present disclosure.
Figure 4:
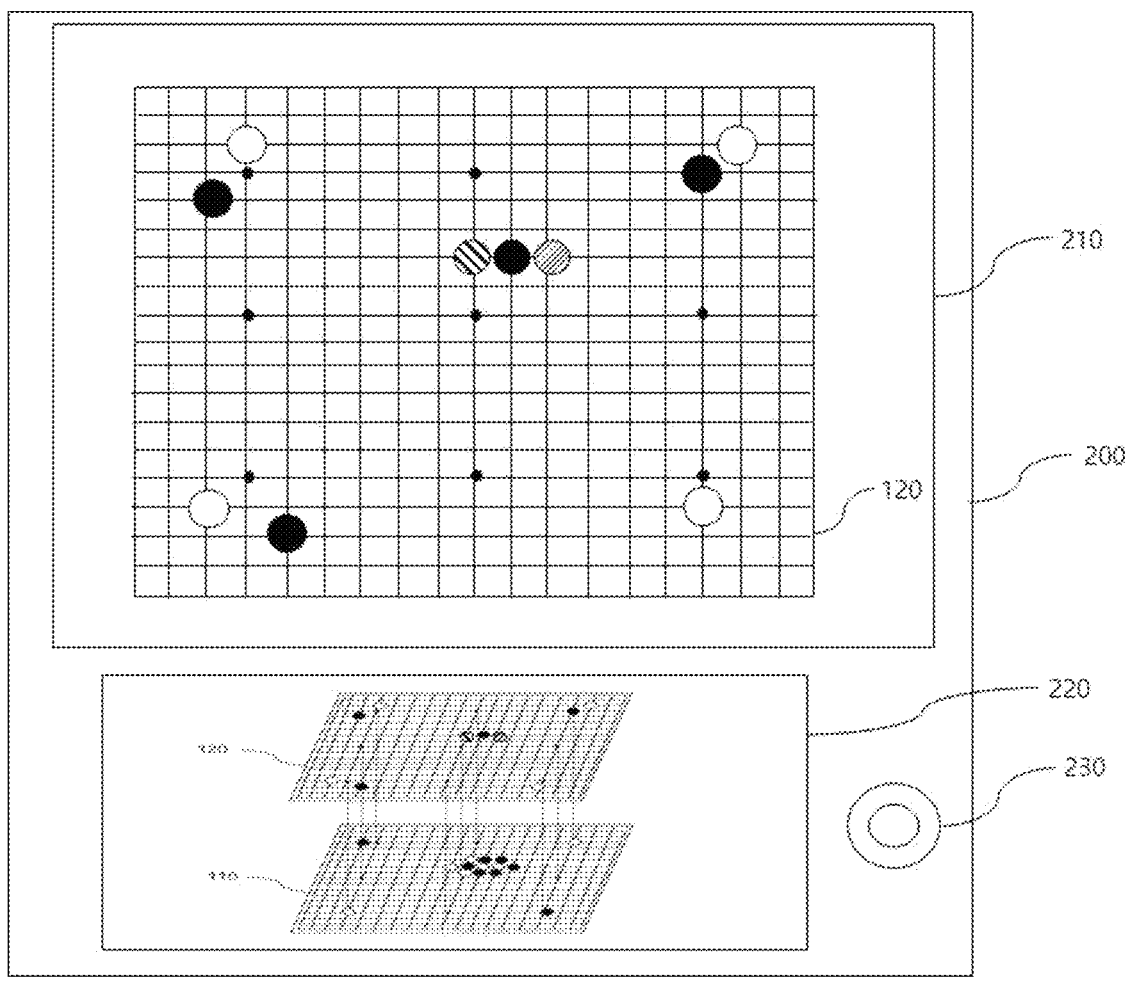
FIG. 4 is a diagram illustrating still another embodiment of a display screen of the online multi-dimensional baduk system in accordance with the present disclosure.
Figure 5:
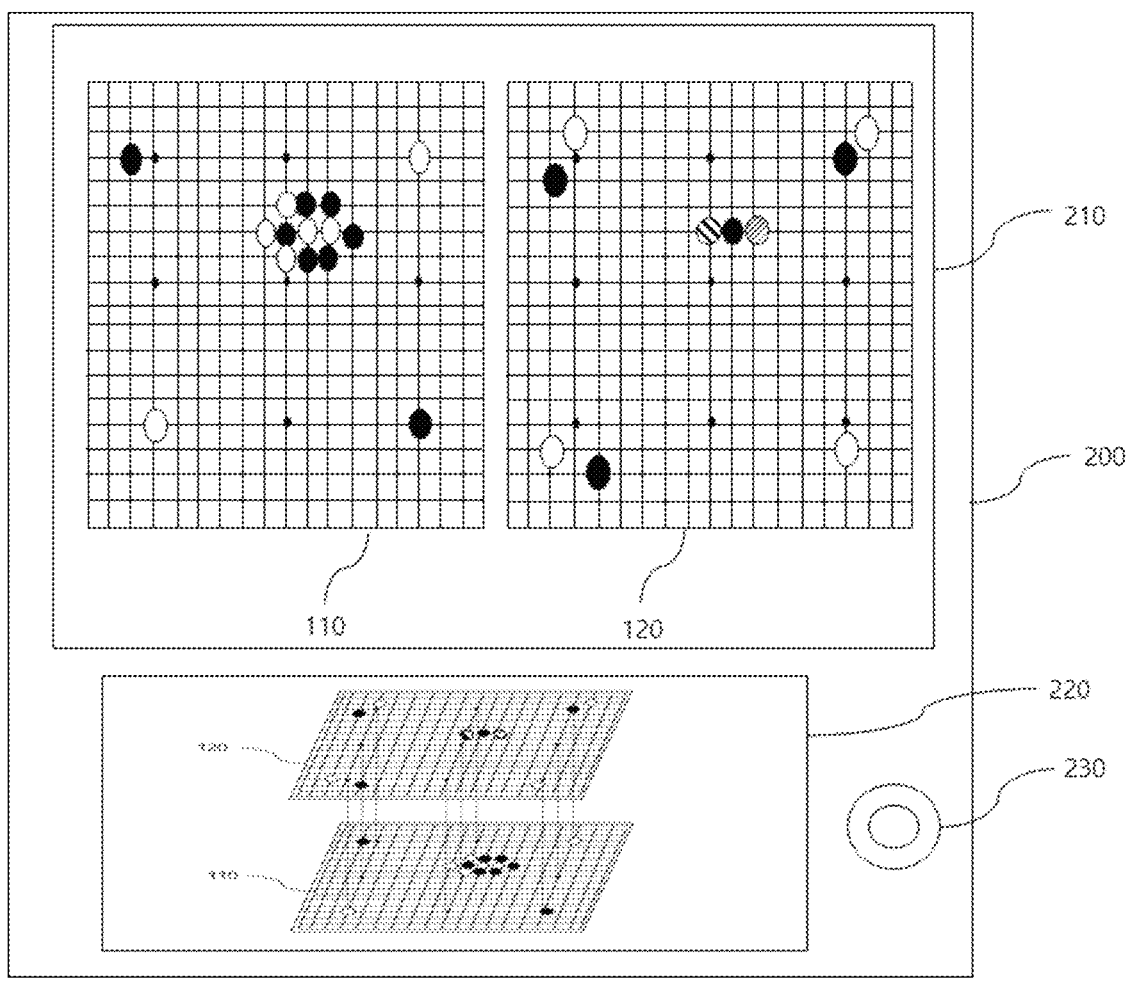
FIG. 5 is a diagram illustrating yet another embodiment of a display screen of the online multi-dimensional baduk system in accordance with the present disclosure.

FIG. 3 to FIG. 5 are diagrams illustrating other embodiments of a display screen of the online multi-dimensional baduk system in accordance with the present disclosure.

FIG. 3 illustrates that the first baduk face 110 is displayed on the main screen 210 and the first baduk face 110 and the second baduk face 120 that are connected to each other in a multi-dimensional manner are displayed on the sub-screen 220, and FIG. 4 illustrates that the second baduk face 120 is displayed on the main screen 210 and the first baduk face 110 and the second baduk face 120 that are connected to each other in a multi-dimensional manner are displayed on the sub-screen 220. Furthermore, FIG. 5 illustrates that the first baduk face 110 and the second baduk face 120 are displayed on the main screen 210 and the first baduk face 110 and the second baduk face 120 that are connected to each other in a multi-dimensional manner are displayed on the sub-screen 220.

That is, a user may freely select a baduk face to be displayed on the main screen 210 and the sub-screen 220 by using the menu button 230.

Although preferred embodiments of the present disclosure have been described in detail, the scope of the present disclosure is not limited thereto, and may be embodied in more various embodiments based on the basic concept of the present disclosure defined in the following claims, and such embodiments also fall within the scope of the present disclosure.

What is claimed is:

1. A multi-dimensional baduk game board comprising:
   a first baduk game face including a first plane in which a plurality of parallel horizontal lines intersect orthogonally to the same number of parallel vertical lines as the horizontal lines;
   a second baduk game face located in a first direction above the first plane of the first baduk game face and including a second plane parallel to the first plane in which a plurality of parallel horizontal lines intersect orthogonally to the same number of parallel vertical lines as the horizontal lines; and
   at least one third baduk game face sequentially stacked and located in the first direction above the second baduk game face and including a third plane in which the same number of parallel horizontal lines and parallel vertical lines as the parallel horizontal lines and the parallel vertical lines of the second baduk game face intersect orthogonally,
   wherein intersection points where the horizontal lines and the vertical lines on the first baduk game face in the first plane intersect correspond respectively to intersection points where the horizontal lines and the vertical lines on the second baduk game face in the second plane located in the first direction above intersect, and are respectively in alignment with the each other through parallel virtual connection lines which span from the first plane to the second plane.

2. The multi-dimensional baduk game board of claim 1, wherein the number of the horizontal lines and the vertical lines included in each of the first baduk game face and the second baduk game face are each 19.

3. An online multi-dimensional baduk game system that allows online users to play multi-dimensional baduk game by using a multi-dimensional electronic baduk game board comprising:
   a server configured to communicate, via the Internet, with the online users during game play;
   a first electronic baduk game face display and a second electronic baduk game face display, the first electronic baduk game face display including a first plane in which a plurality of parallel horizontal lines intersect orthogonally the same number of parallel vertical lines as the horizontal lines, the second electronic baduk game face display being located in a first direction above the first electronic baduk game face display and including a second plane in which the same number of parallel horizontal lines and parallel vertical lines as the parallel horizontal lines and the parallel vertical lines of the first electronic baduk game face display intersect orthogonally,
   wherein intersection points where the horizontal lines and the vertical lines on the first electronic baduk game face display intersect correspond respectively to intersection points where the horizontal lines and the vertical lines on the second electronic baduk game face display located in the first direction above intersect, and are respectively in alignment with the each other through parallel virtual connection lines which span from the first plane to the second plane, and
   wherein the first electronic game face display and the second electronic game face display are connected to communicate with the server configured to distinguish between the first electronic baduk game face and the second electronic baduk game face in three-dimensional space to communicate with the online users during game play.

4. The online multi-dimensional baduk game system of claim 3, wherein existing baduk game rules are equally applied to each of the first electronic baduk game face display and the second electronic baduk game face display, and are also equally applied between the first baduk game face display and the second baduk game face display.

5. The online multi-dimensional baduk game system of claim 3, wherein a first color of baduk game stone located at an intersection point of the first baduk game face display is caught when a second color of baduk game stones are placed at intersection points in four distinct orthogonal directions on the first baduk game face display, which surround the first color of baduk game stone, and an intersection point on the second baduk game face display, which corresponds to the intersection point of the first baduk game face display on which the first color of baduk game stone is placed.

6. The online multi-dimensional baduk game system of claim 3, wherein the first baduk game face display and the second baduk game face display are electronically displayed in different colors on an electronic screen,
   edges of first and second baduk game stones placed on the first baduk game face display are electronically displayed in the same color as a color of the first baduk game face display, and
   edges of first and second baduk game stones placed on the second baduk game face display are electronically displayed in the same color as a color of the second baduk game face display.

7. The online multi-dimensional baduk game system of claim 6, further comprising:
   a baduk game face rotation electronic display means configured to allow a user to electronically display the first baduk game face display and the second baduk game face on an electronic screen in various directions.

8. The online multi-dimensional baduk game system of claim 6, the online multi-dimensional baduk game system is provided with an electronic main screen and an electronic sub-screen and further comprises:
an electronic screen selection means configured to allow a user select that the first baduk game face display and the second baduk game face display are three-dimensionally displayed on the electronic main screen or select that any one of the first baduk game face display and the second baduk game face display is displayed on the electronic main screen.

\* \* \* \* \*